(12) United States Patent
Miyama et al.

(10) Patent No.: US 6,980,705 B2
(45) Date of Patent: Dec. 27, 2005

(54) OPTICAL WAVEGUIDE DEVICE

(75) Inventors: Yasuyuki Miyama, Tokyo (JP);
Hirotoshi Nagata, Tokyo (JP);
Toshihiro Sakamoto, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 120 days.

(21) Appl. No.: 10/451,435

(22) PCT Filed: Nov. 28, 2001

(86) PCT No.: PCT/JP01/10399

§ 371 (c)(1),
(2), (4) Date: Nov. 12, 2003

(87) PCT Pub. No.: WO02/057840

PCT Pub. Date: Jul. 25, 2002

(65) Prior Publication Data

US 2004/0067021 A1    Apr. 8, 2004

(30) Foreign Application Priority Data

Dec. 27, 2000 (JP) .............................. 2000-396444

(51) Int. Cl.[7] .............................................. G02F 1/035
(52) U.S. Cl. .............................................. 385/2; 385/8
(58) Field of Search ...................................... 385/1–10

(56) References Cited

U.S. PATENT DOCUMENTS 5,214,724 A * 5/1993 Seino et al. .................... 385/2
5,422,966 A * 6/1995 Gopalakrishnan et al. ..... 385/2

(Continued)

FOREIGN PATENT DOCUMENTS

| EP | 1 020 754 A1 | 7/2000 |
| JP | A 4-14010 | 1/1992 |
| JP | A 07-028008 | 1/1995 |
| JP | A 7-28008 | 1/1995 |
| JP | A 8-321805 | 12/1996 |
| JP | A 2000-227581 | 8/2000 |
| JP | A 2000-275590 | 10/2000 |

OTHER PUBLICATIONS

Nagata et al., "Temperature dependence of dc drift of Ti:LiNbO, optical modulators with sputter deposited $SiO_2$ buffer layer", J. Appl. Phys., vol. 73, No. 9, pp. 4162-4164, 1993.

(Continued)

*Primary Examiner*—Sung Pak
(74) *Attorney, Agent, or Firm*—Oliff & Berridge, PLC

(57) ABSTRACT

A first film (8) is formed between a substrate (1) and a signal electrode (3); ground electrodes (5) and (6) which constitute an optical waveguide device (10), and a second film (9) is formed between the substrate (1) and a signal electrode (4); ground electrodes (6) and (7). An optical phase modulator (10A) is composed of the substrate (1), an optical waveguide (2), the signal electrode (3), the ground electrodes (5) and (6), and the first film (8). An optical intensity modulator (10B) is composed of the substrate (1), the optical waveguide (2), the signal electrode (4), the ground electrodes (6) and (7), and the second film (9). The optical waveguide device (10) is composed of the optical phase modulator (10A) and the optical intensity modulator (10B), which are integrated monolithically.

4 Claims, 2 Drawing Sheets

U.S. PATENT DOCUMENTS

| | | | |
|---|---|---|---|
| 5,644,664 A | * | 7/1997 | Burns et al. .................... 385/2 |
| 5,999,300 A | | 12/1999 | Davies et al. |
| 6,236,772 B1 | * | 5/2001 | Tavlykaev et al. ............. 385/2 |
| 6,337,931 B1 | * | 1/2002 | Seino .......................... 385/11 |
| 6,522,792 B1 | * | 2/2003 | Sugamata et al. ............. 385/2 |

OTHER PUBLICATIONS

H. Nagata et al., "Impurity Evaluations of $SiO_2$.Films Formed on $LiNbO_3$ Substrates," *Japanese Journal of Applied Physics, Part 1*, vol. 34, No. 2A, pp. 606-609 (Feb. 1995).

* cited by examiner

OPTICAL WAVEGUIDE DEVICE

FIELD OF THE INVENTION

This invention relates to an optical waveguide device, on which plural elements with different functions are integrated, and particularly usable for long-haul and high-capacity optical fiber communication systems and optical measuring instruments.

BACKGROUND ART

An optical waveguide device comprising of an optical waveguide, a buffer layer and traveling-wave type electrodes which are integrated on a substrate having an electro-optic effect made of lithium niobate (LN) or the like, has been widely employed for long-haul and high-capacity optical fiber communication systems and optical measuring instruments. Particularly, an optical intensity modulator, an optical phase modulator and a polarization scrambler are frequently employed as a key device for optical fiber communication systems.

Recently, with the increase of data traffic due to the rapid advance of the Internet, the optical fiber communication system is required to have faster transmission speed and higher capacity. Then, in order to realize such a high-speed and high-capacity optical fiber communication system, it is required to repress the broadening of an optical pulse due to the slight optical dispersion in an optical fiber employed as a transmission line.

As a repressing method, it is proposed that the chirp degree in the optical fiber communication system is controlled by an optical phase modulator placed after an optical intensity modulator as a converter of an electric signal into an optical pulse and thus, improve the transmission performance of the system.

As mentioned above, there is a trend to install plural optical modulators in the optical fiber communication system, but with the increase of the number of optical modulators, the insertion loss is also increased. In this point of view, the demand for monolithic integration of plural optical modulators becomes higher because the insertion loss in the optical fiber communication system will be reduced by decreasing the substantial number of optical modulators, instead of a conventional optical communication structure in which plural optical modulators are joined by means of fiber splicing.

Such a monolithically integrated optical device is fabricated as follows. First of all, optical waveguides are formed on a given substrate according to the required function, such as optical intensity modulation and optical phase modulation. Then, a buffer layer is formed uniformly on the substrate, and electrodes are formed on the substrate via the buffer layer. As a result, an optical waveguide device on which an optical intensity modulator and an optical phase modulator are monolithically integrated is completed.

Namely, the optical intensity modulator and the optical phase modulator are fabricated on the same condition except their optical waveguide pattern.

In this case, however, the inherent performance of each modulator can not be often exhibited sufficiently, and therefore, the optical waveguide device can not achieve the designed characteristics. For example, when a DC voltage is applied to the optical intensity modulator so as to control the operation point, a relatively large DC drift may occur depending on the fabricating condition of the optical intensity modulator, so that the long-term reliability of the optical intensity modulator may be deteriorated. As a result, when the plural modulators are fabricated on the same substrate to complete an integrated optical waveguide device, as mentioned above, the long-term reliability of the resultant optical waveguide device may be deteriorated.

DESCRIPTION OF THE INVENTION

It is an object of the present invention to improve the performance of an optical waveguide device on which plural elements are monolithically integrated.

In order to achieve the above object, this invention relates to an optical waveguide device including:
  a substrate having an electro-optic effect,
  an optical waveguide formed on the surface of the substrate to guide an optical wave,
  a modulation electrode to modulate the optical wave propagating in the optical waveguide, and
  a buffer layer which is formed between the substrate and the modulation electrode,
  the buffer layer being composed of a first film and a second film in the longitudinal direction of the optical waveguide.

The inventors had studied intensively to find the cause of the insufficient performance of each modulator in an integrated optical waveguide device on which an optical intensity modulator and an optical phase modulator are monolithically integrated.

As a result, they found that the physical property of the buffer layer significantly affects the performance of each modulator. Namely, in a conventional integrated optical device, the buffer layer is formed uniformly on the substrate, so that each modulator is fabricated on the same buffer layer. Therefore, the buffer layer is not formed so as to satisfy the physical properties to be required in each modulator.

For example, in the case that a DC voltage is applied to the optical intensity modulator so as to control the operation point, DC drift may occur remarkably when the density of the buffer layer constituting the optical intensity modulator is increased. Therefore, it is preferable that the buffer layer of the optical intensity modulator has low density.

Moreover, it turns out that the buffer layer constituting the optical phase modulator preferably has high density because a DC voltage is not necessary to apply and attenuation of microwave traveling in the electrodes is reduced.

As a result, when the uniform buffer layer is employed for the optical intensity modulator and the optical phase modulator, each modulator can not exhibit the inherent performance. This invention was completed during the above-mentioned vast and long-term research and development.

In the present invention, monolithically integrated optical intensity modulator and the optical phase modulator can exhibit their inherent performances since the buffer layer is composed of a first film and a second film which have preferable physical properties for each modulator, as mentioned in the above example. Therefore, the integrated optical waveguide device can achieve the designed characteristics.

In a preferable embodiment of the present invention, the ratio (n1/n2) of the refractive index n1 of the first film at a wavelength of 633 nm to the refractive index n2 of the second film at a wavelength of 633 nm is set to be 1.010 or over. Generally, the refractive index of a film strongly depends on the film density when the film is made of the same material. Therefore, the refractive index of the film is increased as the film density is increased. As a result, the above-mentioned requirement means that the density of the first film is higher than that of the second film by a given value.

When the optical phase modulator and the optical intensity modulator are respectively formed on the first film and the second film of the buffer layer, each modulator can exhibit its inherent performance. Therefore, the integrated optical waveguide device can achieve the designed characteristics effectively and efficiently.

In the case that the first film and the second film is made of silicon oxide, it is desired that the refractive index n1 of the first film at a wavelength of 633 nm is set to be 1.455 or over and the refractive index n2 of the second film at a wavelength of 633 nm is set to be 1.440 or below.

In this case, when the optical phase modulator is formed on the first film and the optical intensity modulator is formed on the second film, each modulator can exhibit its inherent performance sufficiently since the density of the first film can be set much higher than that of the second film, and thus, the optical waveguide device can achieve the designed characteristics more sufficiently.

The first film and the second film can be formed by means of sputtering or vapor deposition to satisfy the above-mentioned requirements for refractive indexes. Generally, the density of a film fabricated by sputtering is high, and the density of a film fabricated by vapor deposition is low. Therefore, in order to satisfy the above-mentioned requirements for refractive indexes, it is preferable that the first film is formed by sputtering and the second film is formed by vapor deposition.

BRIEF DESCRIPTION OF THE DRAWINGS

For a better understanding of this invention, reference is made to the attached drawings, wherein.

BEST MODE FOR CARRYING OUT THE INVENTION

Figure 1:
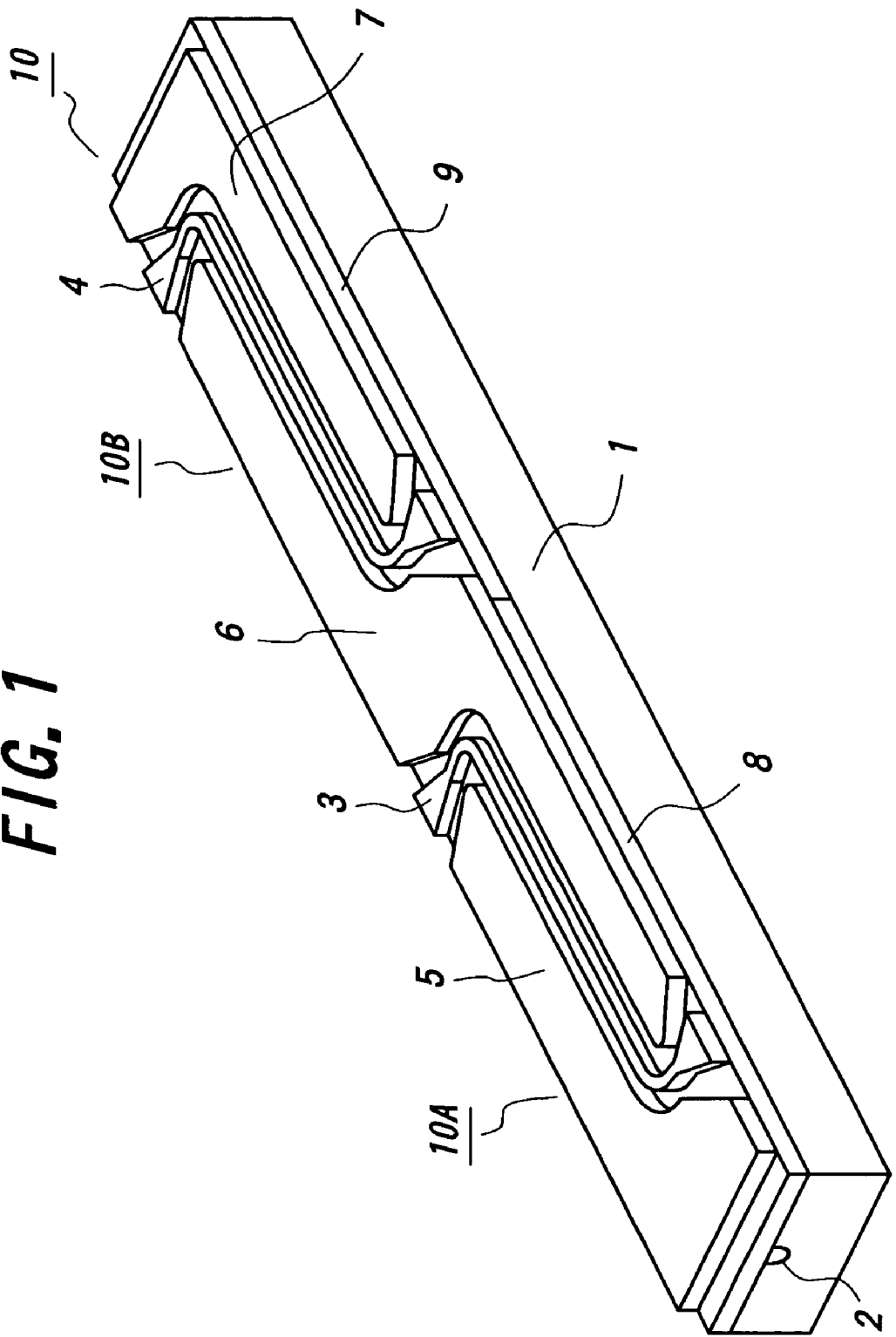
FIG. 1 is a perspective view showing an optical waveguide device according to the present invention.

FIG. 1 is a perspective view showing an optical waveguide device according to the present invention.

An optical waveguide device 10 illustrated in FIG. 1 includes a substrate 1 made of the material having an electro-optic effect, an optical waveguide 2 formed on the surface of the substrate 1, signal electrodes 3 and 4, and ground electrodes 5, 6 and 7. A first film 8 is formed between the substrate 1 and the electrodes 3, 5 and 6, and a second film 9 is formed between the substrate 1 and the electrodes 4, 6 and 7.

An optical phase modulator 10A is composed of the substrate 1, the optical waveguide 2, the signal electrode 3, the ground electrodes 5 and 6, and the first film 8. A DC applied-type optical intensity modulator 10B is composed of the substrate 1, the optical waveguide 2, the signal electrode 4, the ground electrodes 6 and 7, and the second film 9. Therefore, the optical waveguide device 10 is composed of the optical phase modulator 10A and the optical intensity modulator 10B, which are monolithically integrated on the substrate 1.

The first film 8 and the second film 9 are provided as buffer layers for the optical phase modulator 10A and the optical intensity modulator 10B, respectively.

In the optical waveguide device 10 illustrated in FIG. 1, the ratio (n1/n2) of the refractive index n1 of the first film 8 constituting the optical phase modulator 10A at a wavelength of 633 nm to the refractive index n2 of the second film 9 constituting the optical intensity modulator 10B at a wavelength of 633 nm is set to be 1.010 or over, particularly 1.021 or over.

In this case, the density of the first film 8 is relatively higher than that of the second film 9. Namely, the optical phase modulator 10A is composed of a buffer layer having a higher density, so that the attenuation of microwave applied to the signal electrode 3 can be repressed effectively. In contrast, the optical intensity modulator 10B is composed of a buffer layer having a lower density, so that the DC drift can be reduced effectively when a DC voltage is applied to the signal electrode 4.

When the first film 8 and the second film 9 are made of silicon oxide, it is desired that the refractive index n1 of the first film 8 is set to be 1.455 or over, particularly 1.460 or over. In this case, the attenuation of microwave can be repressed more effectively.

Moreover, it is desired that the refractive index n2 of the second film 9 is set to be 1.440 or below, particularly 1.430 or below. In this case, the DC drift occurring when the DC voltage is applied can be reduced more effectively.

As mentioned above, the high refractive index film, that is, high-density first film 8 can be easily formed by means of sputtering. In the case of forming the first film 8 of silicon oxide by sputtering, the chamber of the sputtering apparatus is evacuated until the degree of vacuum reaches to $10^{-7}$ Torr or below. Then, an argon gas and an oxygen gas are introduced into the sputtering chamber until the interior pressure reaches about $10^{-3}$ Torr. Then, a given high frequency electric power is supplied to a silicon oxide target to deposit silicon oxide particles on a given substrate.

In contrast, the low refractive index film, that is, low-density second film 9 can be easily formed by means of vapor deposition. In the case of forming the second film 9 of silicon oxide by vapor deposition, silicon oxide pellets are charged into a copper crucible or the like, and then, electron beams are irradiated onto the pellets so as to be vaporized. As a result, silicon oxide particles are deposited on a given substrate.

The first film 8 and the second film 9 may be formed independently by means of sputtering and vapor deposition by attaching a given mask on the substrate 1. In addition, there is an alternative fabrication method of the films. A given film is formed uniformly by means of sputtering or vapor deposition, and then, removed partially. Thereafter, another film is formed at the removed area by means of vapor deposition or sputtering to complete the first film 8 and the second film 9.

The first film 8 and the second film 9 may be formed by any kind of film-forming method, in addition to sputtering and vapor deposition. For example, the films 8 and 9 may be formed by means of CVD.

After the formation of the first film 8 and the second film 9 constituting the buffer layers for the optical phase modulator 10A and the optical intensity modulator 10B, the first film 8 and the second film 9 may be annealed under an atmosphere that at least includes oxygen, so as to improve the mechanical properties of the films 8 and 9 and compensate oxygen-straved portions of the films 8 and 9.

The substrate 1 may be made of a dielectric single crystal having an electro-optic effect such as lithium niobate (LN), lithium tantalate (LT), and lead lanthanum zirconate titanate (PLZT). Then, an X-cut face, a Y-cut face or a Z-cut face of such a single crystal may be employed as the main surface of the substrate 1.

The optical waveguide 2 may be formed by means of Ti thermal diffusion method, proton exchange method, ion implantation method or epitaxial growth method.

The signal electrodes 3 and 4 and the ground electrodes 5–7 may be made of Au, Ag or Cu by means of vapor deposition method, plating method or the combination thereof.

The first film 8 and the second film 9 may be made of other material, i.e., aluminum oxide, silicon nitride or the combination thereof, instead of silicon oxide.

Figure 2:
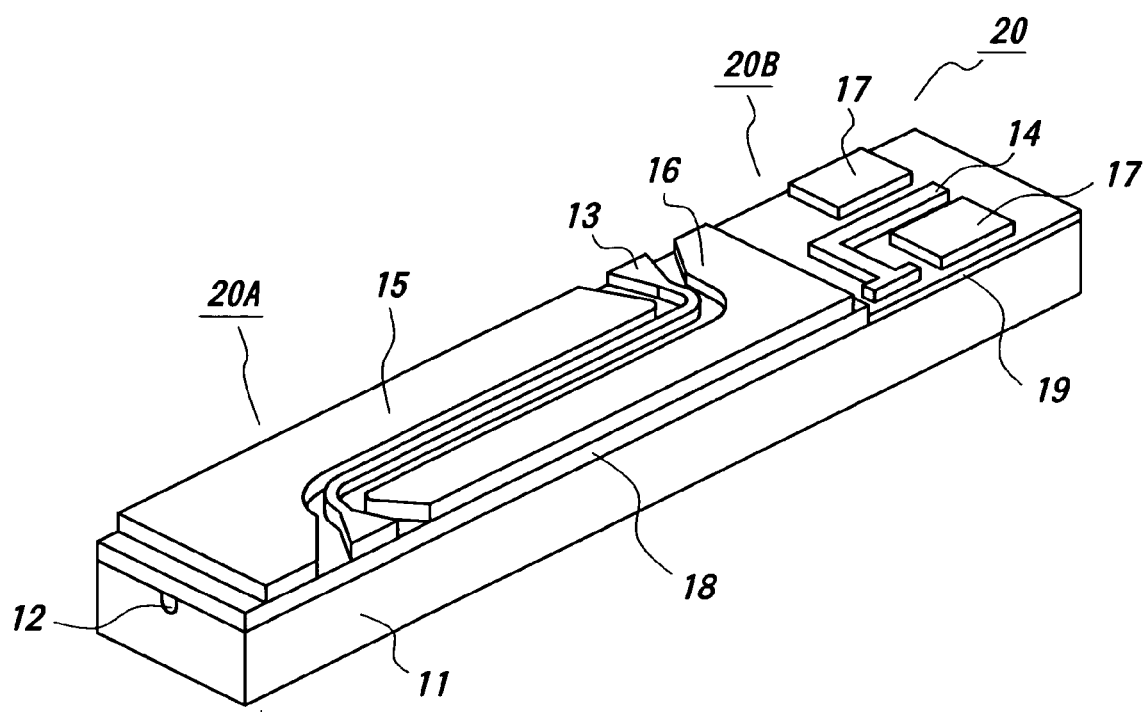
FIG. 2 is a perspective view showing another optical waveguide device according to the present invention.

FIG. 2 is a perspective view showing another optical waveguide device according to the present invention.

An optical waveguide device 20 illustrated in FIG. 2 includes a substrate 11 made of the material having an electro-optic effect, an optical waveguide 12 formed on the surface of the substrate 11, signal electrodes 13 and 14, and ground electrodes 15, 16 and 17. A first film 18 is formed between the substrate 11 and the electrodes 13, 15 and 16, and a second film 19 is formed between the substrate 11 and the electrodes 14 and 17.

An RF applied-type optical intensity modulator 20A is composed of the substrate 11, the optical waveguide 12, the signal electrode 13, the ground electrodes 15 and 16, and the first film 18. A DC electrode section 20B is composed of the substrate 11, the optical waveguide 12, the signal electrode 14, the ground electrode 17, and the second film 19. Therefore, the optical waveguide device 20 is composed of the optical intensity modulator 20A and the DC electrode section 20B, which are monolithically integrated on the substrate 11.

The first film 18 and the second film 19 are provided as buffer layers for the optical intensity modulator 20A and the DC electrode section 20B, respectively.

In the optical waveguide device 20 illustrated in FIG. 2, the ratio (n1/n2) of the refractive index n1 of the first film 18 constituting the optical intensity modulator 20A at a wavelength of 633 nm to the refractive index n2 of the second film 19 constituting the DC electrode section 20B at a wavelength of 633 nm is also set to be 1.010 or over, particularly 1.021 or over. In this case, the attenuation of microwave applied to the signal electrode 13 of the optical intensity modulator 20A can be repressed effectively, and the DC drift can be reduced effectively when a DC voltage is applied to the signal electrode 14 of the DC electrode section 20B.

When the first film 18 and the second film 19 are made of silicon oxide, it is desired that the refractive index n1 of the first film 18 is set to be 1.455 or over and the refractive index n2 of the second film 19 is set to be 1.440 or below.

The first film 18 and the second film 19 may be made by means of sputtering or vapor deposition according to the above-mentioned condition. The substrate 11, the optical waveguide 12, the signal electrodes 13 and 14, and the ground electrodes 15, 16 and 17 may be made of the same material on the same condition as described previously.

Although the present invention was described in detail with reference to the above examples, this invention is not limited to the above disclosure and every kind of variation and modification may be made without departing from the scope of the present invention.

For Example, although in the above embodiment, the optical waveguide device on which the optical phase modulator and the DC applied-type optical intensity modulator or the RF applied-type optical intensity modulator and the DC electrode section are integrated, was explained in detail, in the former case, a DC electrode section may be also integrated.

INDUSTRIAL APPLICABILITY

According to the present invention, plural elements such as an optical phase modulator and an optical intensity modulator, can be monolithically integrated on the substrate so as to be able to exhibit their inherent performances. Therefore, an integrated optical waveguide device can achieve the designed characteristics.

What is claimed is:

1. An optical waveguide device comprising:
   a substrate having an electro-optic effect,
   an optical waveguide to guide an optical wave which is formed on the surface of said substrate,
   a modulation electrode to modulate said optical wave propagating in said optical waveguide, and
   a buffer layer which is formed between said substrate and said modulation electrode,
   wherein said buffer layer is composed of a first film and a second film in the longitudinal direction of said optical waveguide, and the ratio (n1/n2) of the refractive index n1 of said first film at a wavelength of 633 nm to the refractive index n2 of said second film at a wavelength of 633 nm is set to be 1.010 or over.

2. The optical waveguide device as defined in claim 1, wherein said first film and said second film are made of silicon oxide, whereby the refractive index n1 of said first film is set to be 1.455 or over at a wavelength of 633 nm and the refractive index n2 of said second film is set to be 1.440 or below at a wavelength of 633 nm.

3. The optical waveguide device as defined in claim 1, wherein said first film is formed by sputtering and said second film is formed by vapor deposition.

4. The optical waveguide device as defined in claim 2, wherein said first film is formed by sputtering and said second film is formed by vapor deposition.

* * * * *